United States Patent
Morimoto (10) Patent No.: US 8,291,486 B2
(45) Date of Patent: Oct. 16, 2012

(54) GATEWAY DEVICE HAVING SOCKET LIBRARY FOR MONITORING, COMMUNICATION METHOD OF GATEWAY DEVICE HAVING SOCKET LIBRARY FOR MONITORING, AND COMMUNICATION PROGRAM OF GATEWAY DEVICE HAVING SOCKET LIBRARY FOR MONITORING

(75) Inventor: Masaharu Morimoto, Minato-ku (JP)

(73) Assignee: NEC Corporation, Tokyo (JP)

( * ) Notice: Subject to any disclaimer, the term of this patent is extended or adjusted under 35 U.S.C. 154(b) by 725 days.

(21) Appl. No.: 12/400,531

(22) Filed: Mar. 9, 2009

(65) Prior Publication Data
US 2009/0228970 A1 Sep. 10, 2009

(30) Foreign Application Priority Data
Mar. 7, 2008 (JP) .................................. 2008-058826

(51) Int. Cl.
*G06F 9/00* (2006.01)
(52) U.S. Cl. ........... 726/12; 709/224; 709/230; 709/213
(58) Field of Classification Search .................. 726/2, 3, 726/12; 709/224, 213, 230
See application file for complete search history.

(56) References Cited

U.S. PATENT DOCUMENTS
7,735,116 B1 * 6/2010 Gauvin .............................. 726/2
2002/0129172 A1 9/2002 Baskey et al.

FOREIGN PATENT DOCUMENTS
| JP | 11-65858 A | 3/1999 |
| JP | 2004-535615 A1 | 11/2004 |
| JP | 2006-127461 A | 5/2006 |

OTHER PUBLICATIONS

Stevens, W. Richard, "UNIX Network Programming, Networking APIs: Sockets and XTI," 1998, vol. 1, Second Edition, ISBN 0-13-490012-X.

* cited by examiner

*Primary Examiner* — Nathan Flynn
*Assistant Examiner* — Phuoc Tran
(74) *Attorney, Agent, or Firm* — Sughrue Mion, PLLC (57) ABSTRACT

Provided is a socket library for monitoring that allows the communication data of a process A to be easily shared by the other processes by way of a socket API. The gateway device uses a socket library for monitoring in which communication content of an application can be shared by a plurality of other applications, the gateway device including a shared memory space provided in the socket library for monitoring; a listen socket controlling section provided in the shared memory space, the listen socket controlling section being for storing a listen socket of an owner process; a process controlling section provided in the shared memory space, the process controlling section being for transmitting and receiving the owner process and the monitoring process; a connected socket controlling section provided in the shared memory space, the connected socket controlling section being for storing a connected socket; a session controlling section for storing a communication session; and a message controlling section for storing communication data that have been actually transmitted and received.

21 Claims, 5 Drawing Sheets

| IP adress | IP adress | port No. | monitor process count | process control section Index |
|---|---|---|---|---|
| | X | Y | 2 | 300 |
| | | | | |
| | | | | |
| | | | | | passive socket controlling section 211

FIG.5 (b)

| Index | socket descriptor | process ID | type | next Index of process control section | Index of connec-ted socket control section |
|---|---|---|---|---|---|
| 100 | 24 | 102 | Monitor | 200 | 1001 |
| 200 | 30 | 105 | Monitor | −1 | 1002 |
| 300 | 40 | 104 | Owner | 100 | 1003 |
| 400 | | | | | | process controlling section 212

FIG.5 (c)

| Index | socket address structure | size of socket address structure | monitor process count | next Index of connected socket control section | first MSG id |
|---|---|---|---|---|---|
| 1001 | Z1 | size of Z1 | 1 | 1002 | 1001 |
| 1002 | Z2 | size of Z2 | 2 | 1003 | 1003 |
| 1003 | | | | | |
| 1004 | | | | | | connected socket controlling section 213

FIG.5 (d)

| socket descriptor | current MSG id | offset | socket option |
|---|---|---|---|
| 5 | 1004 | 0 | blocking |
| 10 | 1001 | 0 | blocking |
| 6 | 1003 | 0 | blocking |
| | | | | session controlling section 214

FIG.5 (e)

| MSG id | message type | message size | data | next MSG id |
|---|---|---|---|---|
| 1001 | RES | 780 | ABCD | 1004 |
| 1002 | | | | |
| 1003 | | | | |
| 1004 | | | | | message controlling section 215

FIG.6

GATEWAY DEVICE HAVING SOCKET LIBRARY FOR MONITORING, COMMUNICATION METHOD OF GATEWAY DEVICE HAVING SOCKET LIBRARY FOR MONITORING, AND COMMUNICATION PROGRAM OF GATEWAY DEVICE HAVING SOCKET LIBRARY FOR MONITORING

BACKGROUND OF THE INVENTION

1. Field of the Invention

The present invention relates to a gateway device having a socket library for monitoring that monitors the communication content in an application; a communication method of a gateway device having a socket library for monitoring; a communication program of a gateway device having a socket library for monitoring; and a socket library for monitoring. The present invention particularly relates to a gateway device having a socket library for monitoring that allows the communication content communicated by a socket in a process to be monitored in other processes; a communication method of a gateway device having a socket library for monitoring; a communication program of a gateway device having a socket library for monitoring; and a socket library for monitoring.

2. Description of the Related Art

There is a method in which a plurality of abnormality detecting applications are integrated to form a gateway device such that a high-performance security gateway is achieved. A representative product is a Unified Threat Management (UTM) that achieves a high-performance security gateway in which are integrated a plurality of functions, such as anti-virus, anti-spam and URL filter functions.

It is of key importance that when a high-performance security gateway device is manufactured, a provider of the device should provide with an Application Program Interface (API) which enables an application developer to readily develop a gateway device. The API is preferably of a more common type, rather than a device-dependent type. Since it is rarely the case that a device provider is also an application developer, employment of a more common-type API allows a device provider and an application developer to develop a product independently of each other. In case where the API provided by the device is not of common type, it is essential that a program should be modified when the device provider uses open source software or third-party applications. However, modification of a program would inevitably involve issues with respect to cost and license, and thus, the integration should preferably conducted with as less modifications as possible.

Further, an application developer can create a more portable program by adjusting a function to a common-type API rather than to a device-dependent API, and thus the development cost is likely to be reduced. An example of a general-purpose API that handles data inputted from a network includes a socket API.

Now, the socket is an interface for an inter-process communication based on the TCP/IP protocol, corresponds to a session layer of an OSI reference model, and is defined between an application layer and a transport layer. A variety of APIs are available as a socket API, details of which are disclosed in the Non-patent Document 1 and so on. Meanwhile, different OSs need different APIs, and thus the configuration of an API slightly differs according to the OS type such as Unix (registered trademark), Linux (registered trademark) and Windows (registered trademark).

Examples of representative API of a socket designed for Unix (trademark registered) include socket( ), bind( ), connect( ), listen( ), accept( ), read( ), write( ) and close( ). To cite an example of a client-server communication using a socket API, a server process creates a socket (socket( ) invocation); assigns an IP address and a port number (bind( ) invocation); and initiates a listen socket outputted from a client process (listen( ) invocation). On the other hand, a client process also creates a socket (socket( ) invocation), and requests a connection to a server process (connect( ) invocation). The server process receives a connection request outputted from a client process (accept( ) invocation), and establishes a connection. Once a connection is established, the client process transmits data to the server process (write( ) invocation). The server process to which data have been transmitted receives the data (read( ) invocation), executes a processing based on the data, and returns the data to the client process (write( ) invocation). The client process receives the data outputted from the server process (read( ) invocation) and executes a processing. After repetition of the request and the response for a while, the client process transmits a connection termination (close( ) invocation), while the server process reads the request (read( ) invocation) to terminate the connection (close( ) invocation).

The advantage of using a socket API when applications are integrated is that both the device developer and the application developer can enjoy the convenience of using the socket API as a well-recognized common-type API. Another advantage of using a socket API for application development is that the data received from the socket can be readily handled as a stream. For example, it is possible to receive and process parts of mail data of 1M bytes (divided by, for instance, 8 k bytes), instead of receiving the entire mail data of 1M bytes and then processing them as a whole. This can avoid the elongated I/O waiting time of the applications until completion of receiving the entire data, thus allowing for efficient execution.

Employment of this socket allows an information processing device storing a plurality of OS's to smoothly perform inter-OS communication without generating unnecessary overhead (Patent Document 1).

Patent Document 2, for example, suggests that in the case of inter-process communication, and not inter-OS communication, an ID is notified by way of socket communication to conduct inter-process communication using a shared memory.

Further, Patent Document 3 suggests an embodiment wherein an I/O operation program is shared by processes operated on each OS, the each OS being separate from each other by means of a partition, and the program being stored in a single information processing device.

[Non-Patent Document 1] Unix (trademark registered) Network Programming, 2nd edition, Vol. 1 Network API: Socket and XTI, W. Richard Stevens, translated by Yoichi Shinoda (Pearson Education)
[Patent Document 1] Japanese Laid-open Patent Publication No. 2006-127461
[Patent Document 2] Japanese Laid-open Patent Publication No. H11-065858
[Patent Document 3] Japanese Patent Application Publication No. 2004-535615

As mentioned above, use of a socket API, which is a versatile and generally-recognized API, will provide cost advantages both for the application developers and for the device developers. However, use of a socket API will involve the following problems when, like a security gateway, communication contents of a single application are shared by a plurality of applications.

The first problem is that one protocol address cannot be bound (bind( )) by a plurality of processes at once. For example, while a process A assigns a protocol address to a socket by bind( ) and executes listen( ), the other process B cannot execute bind( ) using the same protocol address. If bind( ) is invoked, an error is outputted. Hence, a program of the process B describing that a conventional socket API should be used is forced to change.

The second problem is that, due to the above-mentioned first problem, there is no choice but to allow the process B to receive data from the process A by way of inter-process communication in order for the process B to share the communication contents of process A. This demands a change in the program of the process A that the program transmits data to the process B, and a change in the program of the process B that the program receives data from the process A, whereby the program is changed from the original.

The third problem is that, as stated above, the inter-process data transmission and reception results in higher data copying cost. In particular, when one piece of data is shared by n-processes, n-time copies are generated. This problem can be prevented by efficient inter-process communication. Cited Reference 2 discloses an inter-process communication system using a shared memory. However, this system, although provided with an efficient inter-process communication system, fails to solve the first and second problems stated above.

Likewise, Cited References 1 and 3, while disclosing an inter-process communication system, fail to solve the first and second problems stated above. Accordingly, it is clear that none of the Cited References suggest using a socket library that provides with a socket API designed to solve these problems, and using "a gateway device having a socket library for monitoring that monitors the communication content in an application; a communication method of a gateway device having a socket library for monitoring; a communication program of a gateway device having a socket library for monitoring" that solve these problems by way of using the socket library.

SUMMARY OF THE INVENTION

Description of the Invention

It is, therefore, an object of the present invention to provide a "gateway device having a socket library for monitoring that monitors the communication content in an application; a communication method of a gateway device having a socket library for monitoring; a communication program of a gateway device having a socket library for monitoring" that solves the above-mentioned first and second problems and that allows the communication data of a process A to be easily shared by the other processes by means of a socket API.

A gateway device having a socket library for monitoring, to address the above-mentioned problems, has a socket library for monitoring in which communication content of an application can be shared by a plurality of other applications, the gateway device comprising: a shared memory space provided in the socket library for monitoring; a listen socket controlling section provided in the shared memory space, the listen socket controlling section being for storing a listen socket of an owner process; a process controlling section provided in the shared memory space, the process controlling section being for transmitting and receiving an owner process and a monitoring process; a connected socket controlling section provided in the shared memory space, the connected socket controlling section being for storing a connected socket; a session controlling section for storing a communication session; and a message controlling section for storing communication data that have been actually transmitted and received.

Besides, a gateway device having a socket library for monitoring according to the present invention has a socket library for monitoring in which communication content of an application can be shared by a plurality of other applications, wherein: the socket library for monitoring is provided with a shared memory space and a memory space for each process, and wherein the shared memory space comprising: a listen socket controlling section for storing a listen socket of an owner process; a connected socket controlling section for storing a connected socket; and a message controlling section for storing communication data that have been actually transmitted and received, and the memory space of each process comprising: a process controlling section for controlling an owner process and a monitoring process; and a session controlling section for controlling a communication session.

Further, a communication method of the gateway device having a socket library for monitoring according to the present invention is a method wherein a gateway device is used having a socket library for monitoring in which communication content of an application can be shared by a plurality of other applications, the socket library for monitoring having a shared memory space, the method comprising: a step wherein a listen socket controlling section, provided in the shared memory space, stores a listen socket of an owner process; a step wherein a process controlling section, provided in the shared memory space, transmits and receives an owner process and a monitoring process; a step wherein a connected socket controlling section, provided in the shared memory space, stores a connected socket; a step wherein a session controlling section stores a communication session; and a step wherein a message controlling section stores communication data that have been actually transmitted and received.

In addition, a communication method of the gateway device having a socket library for monitoring according to the present invention is a method wherein a gateway device is used having a socket library for monitoring in which communication content of an application can be shared by a plurality of other applications, the socket library for monitoring having a shared memory space and a memory space for each process, and the communication method comprising: in the shared memory space, a step wherein a listen socket controlling section stores a listen socket of an owner process; a step wherein a connected socket controlling section stores a connected socket; and a step wherein a message controlling section stores communication data that have been actually transmitted and received, and in the memory space of each process, a step wherein a process controlling section controls an owner process and a monitoring process; and a step wherein a session controlling section controls a communication session.

Meanwhile, a communication program of a gateway device having a socket library for monitoring uses a gateway device in which communication content of an application can be shared by a plurality of other applications, the socket library for monitoring having a shared memory space, the communication program comprising: a step wherein a listen socket controlling section, provided in the shared memory space, stores a listen socket of an owner process; a step wherein a process controlling section, provided in the shared memory space, transmits and receives an owner process and a monitoring process; a step wherein a connected socket controlling section, provided in the shared memory space, stores a connected socket; a step wherein a session controlling section, stores a communication session; and a step wherein a message controlling section stores communication data that have been actually transmitted and received.

Subsequently, a communication program of a gateway device having a socket library for monitoring uses a gateway device in which communication content of an application can be shared by a plurality of other applications, the socket library for monitoring having a shared memory space and a memory space for each process, the communication program comprising: in the shared memory space, a step wherein a listen socket controlling section stores a listen socket of an owner process; a step wherein a connected socket controlling section stores a connected socket; and a step wherein a message controlling section stores communication data that have been actually transmitted and received, and in the memory space of each process, a step wherein a process controlling section controls an owner process and a monitoring process; and a step wherein a session controlling section controls a communication session.

In addition, a socket library for monitoring designed for a communication program of a gateway device having a socket library for monitoring uses a gateway device having a socket library for monitoring in which communication content of an application can be shared by a plurality of other applications, the socket library for monitoring having a shared memory space, the communication program comprising: a step wherein a listen socket controlling section, provided in the shared memory space, stores a listen socket of an owner process; a step wherein a process controlling section, provided in the shared memory space, transmits and receiving an owner process and a monitoring process; a step wherein a connected socket controlling section, provided in the shared memory space, stores a connected socket; a step wherein a session controlling section stores communication session; and a step wherein a message controlling section stores communication data that have been actually transmitted and received.

Further, a socket library for monitoring designed for a communication program of a gateway device having a socket library for monitoring uses a gateway device having a socket library for monitoring in which communication content of an application can be shared by a plurality of other applications, the socket library for monitoring having a shared memory space and a memory space for each process, the communication program comprising: in the shared memory space, a step wherein a listen socket controlling section, storing a listen socket of an owner process; a step wherein a connected socket controlling section, storing a connected socket; and a step wherein a message controlling section stores communication data that have been actually transmitted and received, and in the memory space of each process, a step wherein a process controlling section controls an owner process and a monitoring process; and a step wherein a session controlling section controls a communication session.

The socket library for monitoring according to the present invention is realized as a wrapper socket API, which is a wrapped socket API. The monitoring process can share the communication content of the owner process by way of storing and controlling in the shared memory the socket information and the communication data handled in the library by the owner process, and by way of allowing the monitoring process to read the data when the monitoring process invokes the wrapper socket API.

The library has, on the shared memory, a listen socket controlling section that controls a listen socket in which bind( ) and listen( ) are executed, a connected socket controlling section that controls a connected socket that is removed by accept( ), either a session controlling section that stores and controls a write position which the owner process has written on the shared memory for each connected socket, or a session controlling section that stores the read position which the monitoring process has read from the shared memory for each connected socket, and a message controlling section that controls the data that have been actually communicated by the owner process.

The owner process performs communication with the client process via the wrapper socket API, when the library binds( ), and stores in the connected socket controlling section the information relative to the listen socket that has initiated listen( ). When a new connection is accepted, the information relative to the connected socket is stored in the connected socket controlling section, and the communication data that have been transmitted and received via the socket is stored in the message controlling section, and the write position is stored and updated in the session controlling section.

When the monitoring process invokes bind( ) with respect to a socket identical with that registered in the listen socket, and when the monitoring process invokes listen( ) to initiate the connection standby mode, the library controls the monitoring process. Further, when the monitoring process invokes accept( ), the library reads the socket information stored in the connected socket controlling section, and obtains a new connection request. In addition, when a read( ) request is executed with respect to the connected socket, the library functions in such a manner that the library obtains the read start position with reference to the session controlling section, that the library reads the communication data stored in the message controlling section, and that the library updates the read position of the session controlling section.

In this way, the socket and the communication data handled by the owner process on the shared memory is controlled inside the socket library for monitoring through the wrapper socket API, and the monitoring process returns the data through the wrapper socket API when the monitoring process accesses the wrapper socket API through the wrapper socket API. This configuration enables the monitoring process to monitor the socket used by the owner process and the data transmitted and received therethrough. This configuration also enables an application to describe the monitoring process by use of a conventional socket API since the data sharing process is hidden from an application. The object of the present invention can thus be achieved.

It is the first advantage of the present invention to allow a plurality of processes to bind( ) sockets having the same protocol address. This curtails the modifications to be rendered to the portion of the socket program of a program for monitoring process. It is because the socket information handled by an owner process is delivered, inside a wrapper socket API, to a monitor socket, whereby it seems that the socket having the same protocol address can be handled.

The second advantage of the present invention is that the communication data of the owner process can be shared without describing any transmission and reception program designed for the monitoring process. This can achieve reduction in the development cost. It is because a data sharing mechanism by means of a shared memory inside the above-described socket library is achieved, and because the communication data of the owner process is delivered to the monitoring process in a location hidden from the applications.

DETAILED DESCRIPTION OF THE INVENTION

Description of the Preferred Embodiments

The embodiment of the present invention will now be described with reference to a plurality of embodiments. The present invention is not to be limited by the above-mentioned embodiment, and the embodiment can be suitably modified within the scope of the technical idea of the present invention.

(Embodiment 1)

Figure 1:
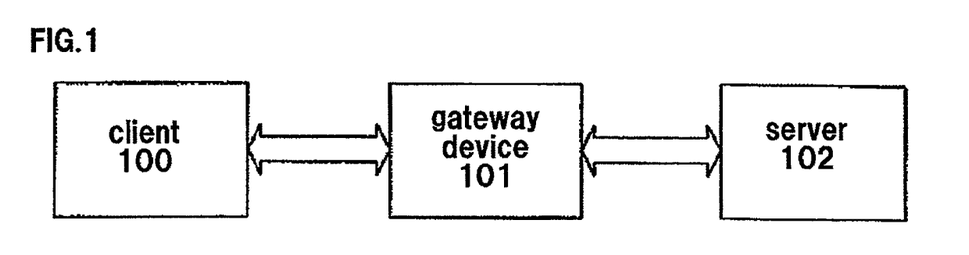
FIG. 1 is an entire configuration diagram of the system comprising a gateway device having a socket library for monitoring according the first Embodiment of the present invention.

FIG. 1 shows that Embodiment 1 of the present invention comprises a client 100, a server 102, and a gateway device 101 that relays the communication therebetween.

Each of these components operates substantially in the following manner. The client 100 conducts via a gateway device a connection request to a server and a data transmission/reception request. The gateway device 101 relays data requested and responded by the client 100 and the server 102, respectively. On the other hand, the server 102 receives and processes connection request and data request from the client 100, and then, the server 102 returns the results to the client.

The gateway device 101 relays the request and response outputted from the server 102 to the client 100. In the gateway device 101, during the relay, a detecting application applies a detection process to the communication contents.

Figure 2:
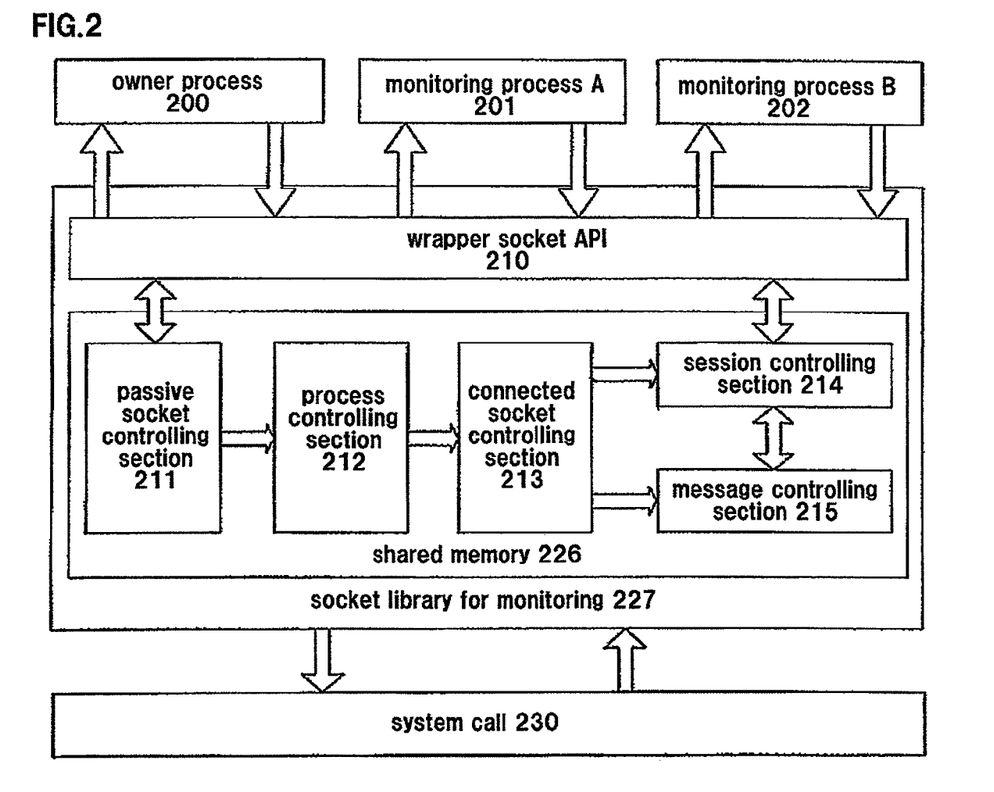
FIG. 2 is a block diagram of the gateway device having a socket library for monitoring according to the first Embodiment of the present invention.

Subsequently, FIG. 2 is indicative of a block diagram inside the gateway device 101. The owner process 200 is a proxy process that relays the request and the response from the client and the server, respectively. Monitoring processes A201 and B202 are processes of the detecting application. Each one of the processes accesses the communication data by way of a socket library for monitoring 227. A socket library for monitoring 227 comprises a wrapper socket API 210 and a shared memory 226. The shared memory 226 comprises a listen socket controlling section 211, a process controlling section 212, a connected socket controlling section 213, a session controlling section 214, and a message controlling section 215.

Each one of these components practically operates in the following manner. In order to receive a connection from the client, the owner process 200 creates a socket using a wrapper socket API, and invokes bind( ) and listen( ). The library, when listen( ) is invoked, registers information concerning the socket onto the listen socket controlling section 211. Further, when the library registers such information on the process controlling section 212 as an owner process, and when listen( ) of a system call 230 is invoked, a listening process is actually initiated, waiting for connection from the client.

When a connection request arrives from the client, the owner process invokes accept( ), whereby a connection with the client is initiated. At this stage, the owner process observes the process controlling section 212 and checks the monitoring process count; and if the monitoring process count is zero, the owner process executes accept( ) of the system call 230 and returns the result without storing connection information or messages. Where there are one or more monitoring processes, in other words, where the monitoring processes invoke listen( ) with respect to a socket having the same protocol address before accepting (accept( ) a new connection request, the owner process executes accept( ) of the system call 230 such that a connection with the client is established. At the same time, information of the connection-established socket is registered in the connected socket controlling section 213, and the session controlling section 214 and the message controlling section 215 are initialized with respect to the sockets, whereby the message controlling section 215 returns the result.

Subsequently, when data transmission/reception with a client starts, a write start position session of the message controlling section 215 is obtained with reference to the session controlling section 214, such that the communication content is stored in the message controlling section 215.

On the other hand, the monitoring process 201, when invoking bind( ), verifies whether the owner process is an active socket or not. If the same as the socket, the monitoring process 201 invokes listen( ), and at the same time, adds the monitoring process itself to the process controlling section 212. Further, when accept( ) is invoked, the connection-established socket is removed from the connected socket controlling section 213, and the session controlling section 214 is initialized. Besides, when read( ) is invoked, a read start position is obtained from the session controlling section 214, whereby the communication content is obtained from the message controlling section 215.

A detailed explanation of the entire operation of the Embodiment will be given with reference to the flowchart of FIGS. 3 and 4 and each table in FIG. 5.

Each of the FIGS. 5(a) to 5(e) shows a control table according to the present invention, where FIG. 5(a) depicts a control table of the listen socket controlling section 211; FIG. 5(b) depicts a control table of the process controlling section 212; FIG. 5(c) depicts a control table of the connected socket controlling section 213; FIG. 5(d) depicts a control table of the session controlling section 214; and FIG. 5(e) depicts a control table of the message control 215.

The listen socket controlling section 211 comprises, for each entry, an IP address, a port number, a monitoring process count, and an Index of the process controlling section. In the control table of the process controlling section 212 are written, for each entry, an Index, a socket descriptor, a process ID, a type indicating whether the process is an owner process or a monitoring process, a next Index of the process controlling section, and an Index of the connected socket controlling section. Here, the next Index of the process controlling section is designed to trace the Index of the monitoring process from the owner process. Further, the Index of the connected socket controlling section is associated with the Index in the control table of the connected socket controlling section 213 as shown in FIG. 5(*c*). The control table of the connected socket controlling section 213 describes, for each entry, each of the items including an Index, a socket address structure, a size of a socket structure, a monitoring process count, a next Index of a connected socket controlling section, and a first MSG id. Here, the first MSG id is indicative of the storage start position of the first data transmitted and received by way of the connected socket, and is indicative of the MSG id of the message controlling section 215. Besides, the first MSG id is set to be the initial value of the current MSG id in the control table of the session controlling section 214. The control table of the session controlling section 214 describes a socket descriptor, a current MSG id indicating the to-be-read-next MSG id of the message controlling section, an offset, and a socket option indicating the option of a socket. The control table of the message control 215 describes, for each entry, a message type indicating whether the message is a sent message or a received message, a data size, data, and a next MSG id.

Figure 3:
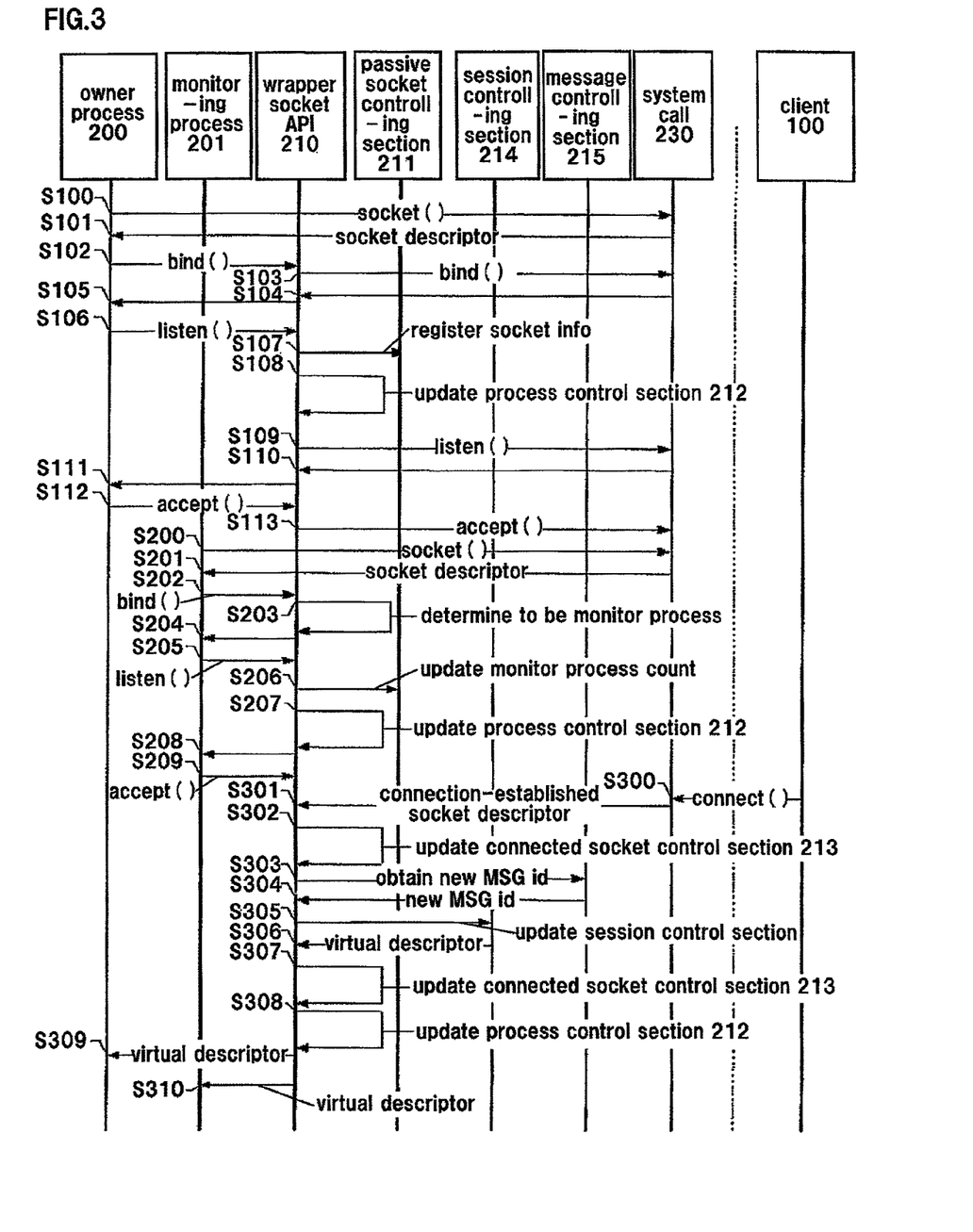
FIG. 3 is a flowchart of the communication method of the gateway device having a socket library for monitoring according to the first Embodiment of the present invention.

FIG. 3 illustrates a flowchart in which the owner process 200 and the monitoring process 201 starts executing the listen( ) in light of the connection request from the client 100, and executes accept( ).

First, the owner process 200 invokes a socket( ) of the system call 230 (Step S100), and receives a new socket descriptor (Step S101).

Next, the owner process 200 invokes bind( ), and assigns a protocol address (Step S102). The function of a wrapper library, from which bind( ) has been invoked (hereinafter referred to "library"), invokes bind( ) of the system call 230 (Step S103), and the results are returned to the library as a return value of the invocation of the wrapper socket API210 (Step S104). Further, the library returns the value to the owner process 200 as a return value (Step S105).

Next, the owner process 200 invokes listen( ) (Step S106) to initiate connection reception. The library, from which listen( ) has been invoked, first of all, stores an IP address and a port number in the listen socket controlling section, sets the monitoring process count to zero, and then stores an Index value for the process controlling section (Step S107). Further, information of the owner process is registered to the process controlling section 212 (process ID, type=Owner, the next Index of the process controlling section=−1, and the next Index of the connected socket controlling section reserves and stores the new entry) (Step S108). Still further, the library invokes listen( ) of the system call 230 (Step S109), and the system call 230 returns the return value to the library (Step S110), and the library returns the return value to the owner process 200 (Step S111).

Next, the owner process 200 invokes accept( ) of the library to the library (Step S112), and then, the library invokes accept( ) of the system call 230 (Step S113).

Suppose that no connection request has come from the client. Then, the owner process 200 is in a blocked state. Further, suppose that the monitoring process 201 initiates listen( ) using a socket having such a protocol address as identical with the socket in which listen( ) has already been initiated.

First, the monitoring process 201 invokes a socket( ) system call (Step S200), and receives a descriptor from the system call 230 (Step S201).

Next, the monitoring process 201 invokes bind( ) of the library (Step S202). The library, when invoked from the monitoring process, does not invoke bind( ) of the system call 230 (Step S203), but directly returns the return value to the monitoring process 201 (Step S204).

Next, when the monitoring process 201 invokes listen( ) of the library (Step S205), the library adds one (1) monitoring process count of the listen socket controlling section 211 (Step S206), and then adds information of the monitoring process 201 (for example, information such as Index 100) to the process controlling section 212. Besides, on such an occasion, the library refers to Index of the connected socket controlling section of the entry of the owner process of the process controlling section 212, and assigns the same value to the Index of the connected socket controlling section of the monitoring process 201 (Step S207), and when terminated, the library notifies the monitoring process 201 (Step S208).

Next, when the monitoring process 201 invokes accept( ), the library refers to the Index of the connected socket controlling section of the process controlling section 212, and then obtains the Index of the to-be-read-next connected socket controlling section 213 (Step S209). Lack of entry in the connected socket controlling section 213 suggests that no new connection is yet to be established, and the monitoring process 201 is blocked.

Suppose here that an initiation request for new connection from the client 100 (Step S300). Then, the owner process 200 that has been blocked by accept( ) of the system call 230 resumes processing and the wrapper socket API 210 receives a connection-established socket descriptor (Step S301), such that the wrapper socket API 210 obtains the Index value of the connected socket controlling section of the process controlling section 212, and such that information (for example, information like entry of Index=1001) is set in the entry of the connected socket controlling section 213 which entry is indicated by the Index. At the same time, the monitoring process count of the listen socket controlling section 211 is obtained such that the monitoring process count of the connected socket controlling section 213 is set to have the same count (Step S302). Note that in the present Embodiment, the monitoring process count is used as a reference counter in such a manner that the monitoring process count is reduced by one (1) every time the monitoring process invokes close( ) to the socket descriptor, and that the monitor process 201 is released when the count reaches zero (0). However, in other Embodiment, the monitoring process count can be used in such a manner that the monitoring process count is reduced by one (1) every time the monitoring process invokes accept( ).

Next, the library initiates a process of obtaining a new entry of MSG id of the message controlling section 215 (Step S303) and receives the MSG id (Step S304). Subsequently, the library secures new entry of the session controlling section 214, sets the socket descriptor, the current MSG id, the offset=0 and the socket option (Step S305), and returns a virtual descriptor to the library (Step S306). Finally, the library secures the next entry of the connected socket controlling section, updates the next Index of the connected socket controlling section 213 (Step S307), updates the next Index of the connected socket controlling section of the entry of the owner process of the process controlling section 212 (Step S308), and returns a virtual descriptor to the owner process (Step S309).

In contrast, the step taken when the monitoring process 201 resumes processing is similar to the step of the owner process.

In the step of the monitoring process, the monitoring process 201 obtains a value registered in an Index of the connected socket controlling section of the process controlling section 212. Information on the connection to be newly accepted (accept( ) is stored in the entry indicated by the Index value of the connected socket controlling section 213. The library reduces by one (1) the monitoring process count of the connected socket controlling section 213 of the entry, obtains a new entry of the session controlling section 214 for the monitoring process 201 in order to initialize the new entry (for example, an entry of socket descriptor=10), and obtains the first MSG id of the entry of the connected socket controlling section 213 to be set as the current MSG id. When the monitoring process count is reduced by one (1) and reaches zero (0), the entry is released. When the entry is released, all of the entry of the related message controlling section 215 is also released. Finally, the library returns to the monitoring process 201 a virtual descriptor as a return value (Step S310).

Figure 4:
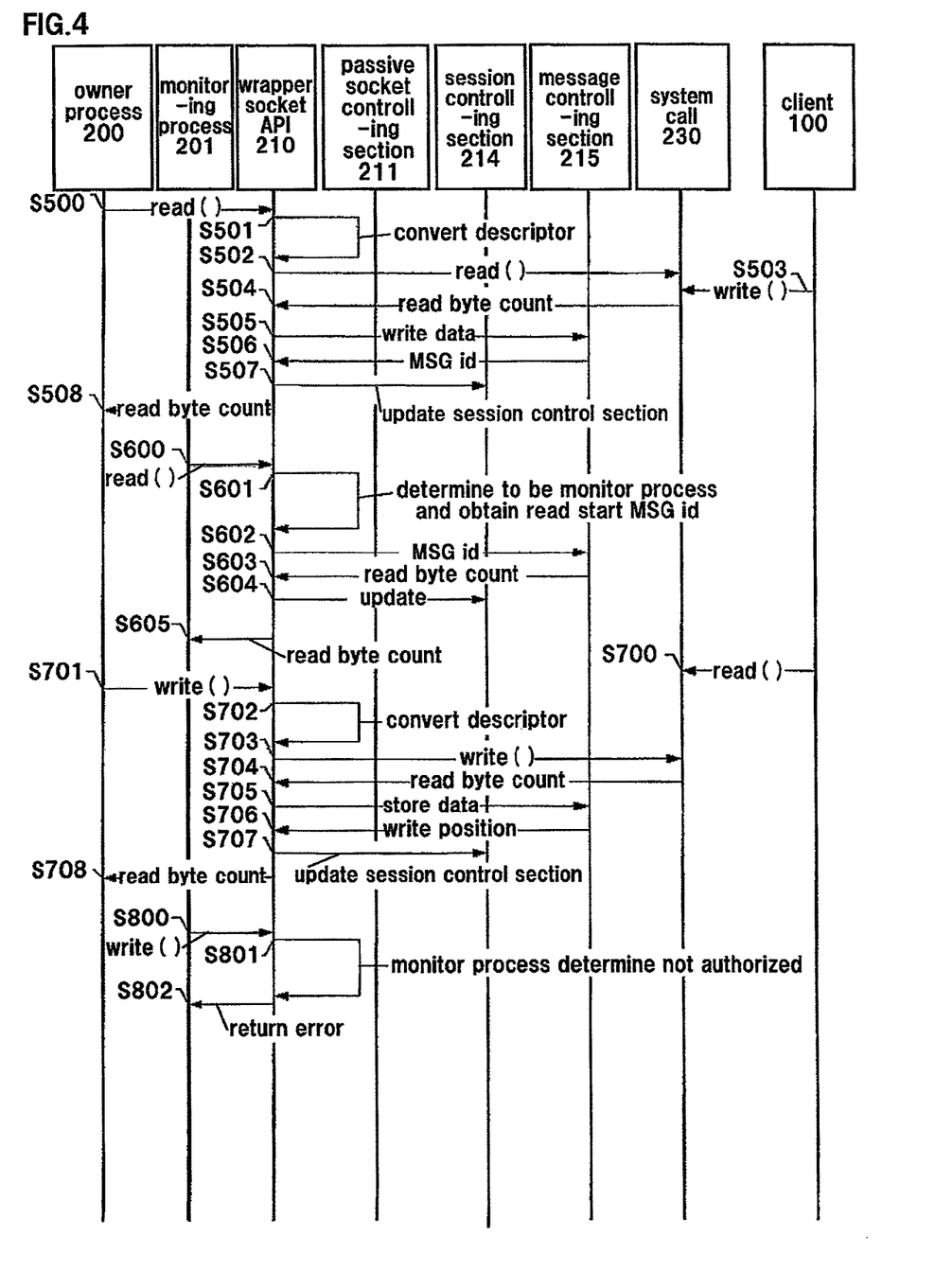
FIG. 4 is a flowchart communication method of the gateway device having a socket library for monitoring according to the first Embodiment of the present invention.
Figure 5:
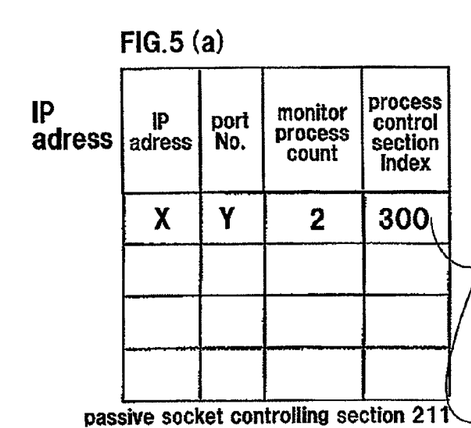
FIG. 5(a) is a condition table of the listen socket controlling section 211 in the communication method of the gateway device having a socket library for monitoring according to the first Embodiment of the present invention.
FIG. 5(b) is a condition table of the process controlling section 212 in the communication method of the gateway device having a socket library for monitoring according to the first Embodiment of the present invention.
FIG. 5(c) is a condition table of the connected socket controlling section 213 in the communication method of the gateway device having a socket library for monitoring according to the first Embodiment of the present invention.
FIG. 5(d) is a condition table of the session controlling section 214 in the communication method of the gateway device having a socket library for monitoring according to the first Embodiment of the present invention.
FIG. 5(e) is a condition table of the message controlling section 215 in the communication method of the gateway device having a socket library for monitoring according to the first Embodiment of the present invention.

FIG. 4 illustrates a flowchart in which the owner process 200 and the monitoring process 201 reads (read( )) from, and writes (write( )) to, the connected socket. First, the owner process 200 executes read( ) with regard to the virtual descriptor. More specifically, the owner process 200 invokes read( ) of the wrapper socket API 210 (Step S500). The library refers to the session controlling section 214, converts the registered virtual descriptor into the actual descriptor, and obtains the converted descriptor (Step S501). Besides, the library executes invocation of a read( ) function of the system call 230 (Step S502).

Next, the library obtains a MSG id and an offset from the session controlling section 214, and writes a message from the location of an offset of the entry of MSG id of the message controlling section 215. If the message type is changed, in other words, if a transmission mode is switched to a reception mode and vice versa, an entry message controlling section is newly obtained and written (Step S505). After the writing is completed, the MSG id and the offset is obtained (Step S506). The library updates the information on which parts of the data are stored as a current MSG id and offset value based on the obtained MSG id (Step S507), and finally, returns the information to the owner process as a read byte count (Step S509).

Further, here, when the monitoring process 201 executes read( ) (Step S600), the library recognizes that the process is a monitoring process, and thus obtains the current MSG id and offset of the session controlling section (Step S601).

In addition, the library sequentially obtains data from the data stored in the entry which data is indicated by the MSG id of the message controlling section 215 (Step S602), and obtains the read byte count (Step S603). Subsequently, the library updates the next read position in the form of the current MSG id and offset of the session controlling section 214 (Step S604), and returns the read byte count to the monitoring process 201.(Step S605).

Next, with the read( ) function being executed from the client (Step S700), the owner process 200 invokes the write( ) function of the library (Step S701). The library refers to the session controlling section 214, and converts into the actual descriptor (Step S702). Next, the library executes a write( ) function of the system call 230 (Step S703), and receives the actual write byte count (Step S704). Subsequently, the library stores the data actually written in the message controlling section 215 and the information on the data (for example, information such as MSG id=1001) (Step S705), and obtains the write position (MSG id and offset) (Step S706), and further, updates the current MSG id and the offset of the session controlling section 214 with reference to the information on the write position (Step S707). Finally, the library returns the write byte count to the owner process 200 as a return value (Step S708).

Besides, if the monitoring process 201 invokes the write( ) function to the library, the library recognizes that the process is a monitoring process, and thus decides to reject the write (Step S802), and returns the error results to the monitoring process 201 (Step S803)

Next, an explanation will be given with respect to the advantageous effect of the present Embodiment.

In the present Embodiment, the invention is configured such that the correspondence relation of the actual socket descriptor and the virtual socket descriptor is controlled in the library, and such that the communication content of the owner process is stored and controlled. This configuration allows the monitoring process to monitor the communication content of the owner process using a socket of the same protocol address.

This enables the monitoring process to describe a monitor program by means of the conventional socket API. Besides, the configuration provides a merit of simpler mounting.

(Embodiment 2)

Next, a detailed explanation of the second Embodiment of the present invention will be given with reference to the drawings.

Figure 6:
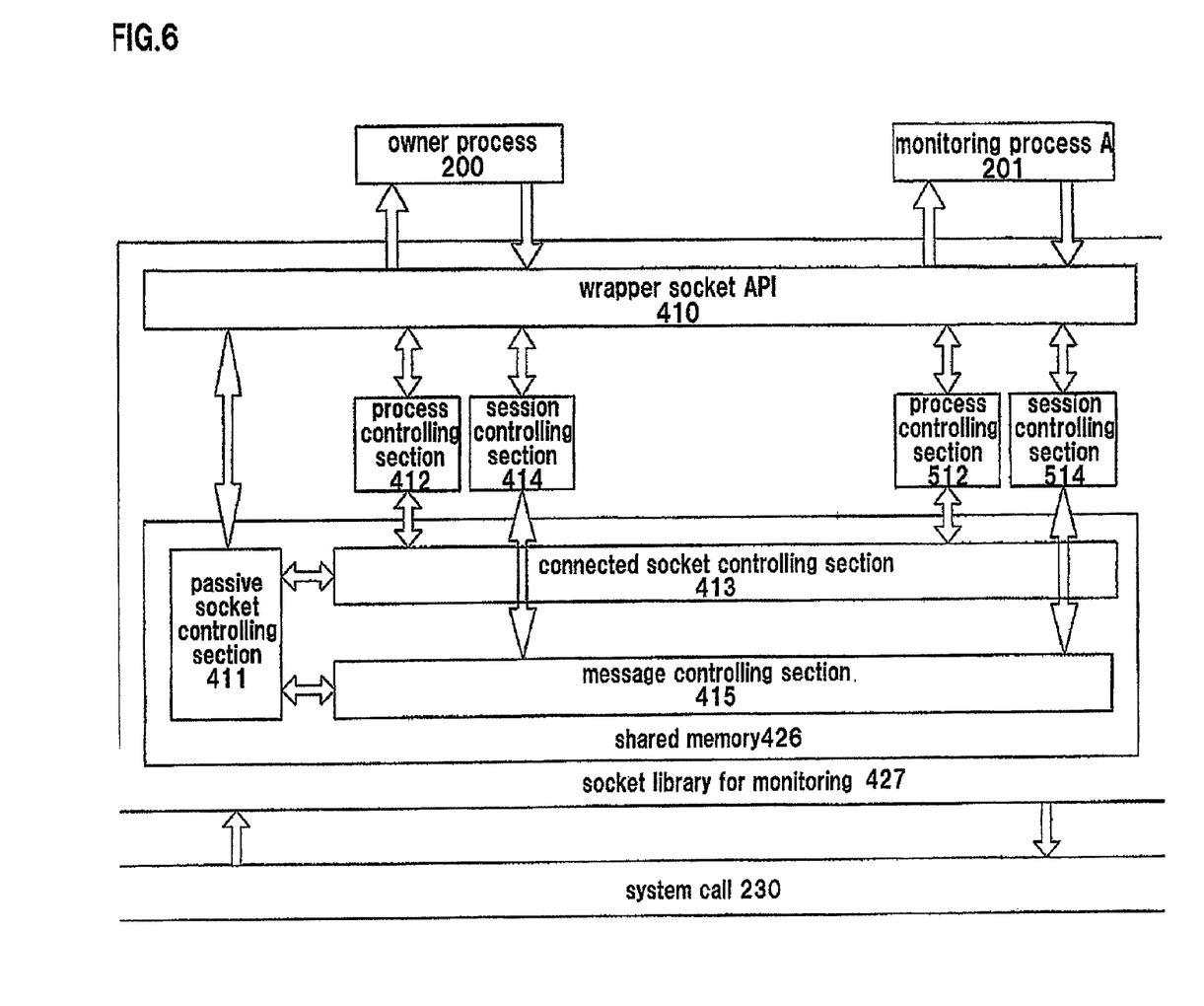
FIG. 6 is a block diagram of the gateway device having a socket library for monitoring according to the first Embodiment of the present invention.

Referring to FIG. 6 showing the second Embodiment of the present invention in comparison with FIG. 2, a process controlling section 412 corresponding to the owner process 200, a session controlling section 414 corresponding to the owner process 200, a process controlling section 512 corresponding to the monitoring process 201, and a session controlling section 514 corresponding to the monitoring process 201 are arranged outside a shared memory 426, in other words, arranged in the memory space of each process. The process controlling section 412 and the process controlling section 512 are connected to the connected socket controlling section 413, while the session controlling section 414 and the session controlling section 514 are connected to the message controlling section 415. The listen socket controlling section 411, the process controlling section 412, the process controlling section 512, the session controlling section 414 and the session controlling section 514 are all connected to the wrapper socket API 410.

The listen socket controlling section 411, the connected socket controlling section 413 and the message controlling section 415 are mounted in the shared memory 426.

The rest of the components and the flowchart is similar to those of the first Embodiment. As to the components and the flowchart similar to those in the first Embodiment, reference numerals are used identical with those in the FIG. 2, and thus, a detailed explanation will be omitted for brevity.

Next, an explanation will be given with respect to the advantageous effect of the Embodiment 2.

In the best mode for carrying out the present invention, the process controlling section 412 and the session controlling section 414 are configured not to be the data in the shared memory but rather to be the local data dedicated for each process. This eliminates unnecessary overhead at the time of accessing to each block, allowing for high-speed processing. Meanwhile, the first embodiment provides a merit of simpler mounting.

The present invention can be used for data sharing among applications on a security gateway by way of a socket. In addition, the present invention can also be used for monitoring the proxied data in a device like a Web proxy and other proxies.

What is claimed is:

1. A gateway device having a socket library for monitoring in which communication content of an application can be shared by a plurality of other applications, the gateway device comprising:
- a shared memory space provided in the socket library for monitoring;
- a listen socket controlling section provided in the shared memory space, the listen socket controlling section being for storing a listen socket of an owner process;
- a process controlling section provided in the shared memory space, the process controlling section being for transmitting and receiving an owner process and a monitoring process;
- a connected socket controlling section provided in the shared memory space, the connected socket controlling section being for storing a connected socket; a session controlling section for storing a communication session; and a message controlling section for storing communication data that have been actually transmitted and received.

2. A gateway device having a socket library for monitoring in which communication content of an application can be shared by a plurality of other applications, wherein the socket library for monitoring is provided with a shared memory space and a memory space for each process, and wherein the shared memory space comprises:
- a listen socket controlling section for storing a listen socket of an owner process;
- a connected socket controlling section provided in the shared memory space; and
- a message controlling section for storing communication data that have been actually transmitted and received, and wherein the memory space for each process comprises:
- a process controlling section for controlling an owner process and a monitoring process; and
- a session controlling section for controlling a communication session.

3. The gateway device having a socket library for monitoring as defined in claim 1 or 2, wherein the listen socket controlling section is provided with a table for controlling a protocol address and a referenced process count.

4. The gateway device having a socket library for monitoring as defined in claim 1 or 2, wherein the process controlling section is provided with a table for controlling:
- a descriptor of the listen socket retained by each process; and
- a connected socket that starts connection from the listen socket and is in operation.

5. The gateway device having a socket library for monitoring as defined in claim 1 or 2, wherein the connected controlling section is provided with a table for controlling:
- socket information relative to the connected socket;
- a referenced process count of the socket; and
- a start position of the table in which position the communication data are stored.

6. The gateway device having a socket library for monitoring as defined in claim 1 or 2, wherein the session controlling section is provided with a table for controlling:
- a descriptor of the connected socket retained by each process;
- in the case of the owner process, a write position of the data communicated by way of the descriptor; and
- in the case of the monitoring process, a read position of the stored data.

7. The gateway device having a socket library for monitoring as defined in claim 1 or 2, wherein the message controlling section is provided with a table for controlling:
- a length of communication data during communication of the owner process by way of the each connected socket; and
- the actual data.

8. A communication method of a gateway device having a socket library for monitoring, comprising:
- a step wherein a gateway device having a socket library for monitoring is used in which communication content of an application can be shared by a plurality of other applications, the socket library for monitoring having a shared memory space;
- a step wherein a listen socket controlling section, provided in the shared memory space, stores a listen socket of an owner process;
- a step wherein a process controlling section, provided in the shared memory space, transmits and receives an owner process and a monitoring process;
- a step wherein a connected socket controlling section, provided in the shared memory space, stores a connected socket;
- a step wherein a session controlling section stores a communication session; and
- a step wherein a message controlling section stores communication data that have been actually transmitted and received.

9. A communication method of a gateway device having a socket library for monitoring, comprising:
- a step of using a gateway device having a socket library for monitoring in which communication content of an application can be shared by a plurality of other applications, the socket library for monitoring having a shared memory space and a memory space for each process;
- in the shared memory space,
- a step wherein a listen socket controlling section stores a listen socket of an owner process;
- a step wherein a connected socket controlling section stores a connected socket; and
- a step wherein a message controlling section stores communication data that have been actually transmitted and received, and
- in the memory space of each process,
- a step wherein a process controlling section controls an owner process and a monitoring process; and
- a step wherein a session controlling section controls a communication session.

10. The communication method of a gateway device having a socket library for monitoring as defined in claim 8 or 9, wherein the listen socket controlling section performs communication, the listen socket controlling section having a table for controlling a protocol address and a referenced process count.

11. The communication method of a gateway device having a socket library for monitoring as defined in claim 8 or 9, wherein the process controlling section controls:
- a descriptor of a listen socket retained by each process; and
- a connected socket that starts connection from the listen socket and is in operation.

12. The communication method of a gateway device having a socket library for monitoring as defined in claim 8 or 9, wherein the connected controlling section controls:
- socket information relative to the connected socket;
- a referenced process count of the socket; and
- a start position of a table in which position the communication data are stored.

13. The communication method of a gateway device having a socket library for monitoring as defined in claim 8 or 9, wherein the session controlling section controls:
- a descriptor of the connected socket retained by each process;
- in the case of the owner process, a write position of the data communicated by way of the descriptor; and
- in the case of the monitoring process, a read position of the stored data.

14. The communication method of a gateway device having a socket library for monitoring as defined in claim 8 or 9, wherein the message controlling section controls:
- a length of the communication data during communication of the owner process by way of the each connected socket; and
- the actual data.

15. A non-transitory computer-readable medium storing a communication program that causes a computer to execute a monitoring process, the monitoring process comprising:
- a step wherein a gateway device having a socket library for monitoring is used in which communication content of an application can be shared by a plurality of other applications, the socket library for monitoring having a shared memory space;
- a step wherein a listen socket controlling section, provided in the shared memory space, stores a listen socket of an owner process;
- a step wherein a process controlling section, provided in the shared memory space, transmits and receives an owner process and a monitoring process;
- a step wherein a connected socket controlling section, provided in the shared memory space, stores a connected socket;
- a step wherein a session controlling section stores a communication session; and
- a step wherein a message controlling section stores communication data that have been actually transmitted and received.

16. A non-transitory computer-readable medium storing a communication program that causes a computer to execute a monitoring process, the monitoring process comprising:
- a step wherein a gateway device having a socket library for monitoring is used in which communication content of an application can be shared by a plurality of other applications, the socket library for monitoring having a shared memory space and a memory space for each process;
- in the shared memory space,
- a step wherein a listen socket controlling section stores a listen socket of an owner process;
- a step wherein a connected socket controlling section stores a connected socket; and
- a step wherein a message controlling section stores communication data that have been actually transmitted and received, and
- in the memory space of each process,
- a step wherein a process controlling section controls an owner process and a monitoring process; and
- a step wherein a session controlling section controls a communication session.

17. The non-transitory computer-readable medium as defined in claim 15 or 16, wherein
the listen socket controlling section performs communication, the listen socket controlling section having a table for controlling a protocol address and a referenced process count.

18. The non-transitory computer-readable medium as defined in claim 15 or 16, wherein the process controlling section controls:
- a descriptor of the listen socket retained by each process; and
- a connected socket that starts connection from the listen socket and is in operation.

19. The non-transitory computer-readable medium as defined in claim 15 or 16, wherein the connected controlling section controls:
- socket information relative to the connected socket;
- a referenced process count of the socket; and
- a start position of a table in which position communication data are stored.

20. The non-transitory computer-readable medium as defined in claim 15 or 16, wherein the session controlling section controls:
- a descriptor of the connected socket retained by each process;
- in the case of the owner process, a write position of the data communicated by way of the descriptor; and
- in the case of the monitoring process, a read position of the stored data.

21. The non-transitory computer-readable medium as defined in claim 15 or 16, wherein the message controlling section controls:
- a length of communication data during communication of the owner process by way of the each connected socket; and
- the actual data.

* * * * *